US008941069B2

(12) United States Patent
Gutierrez

(10) Patent No.: US 8,941,069 B2
(45) Date of Patent: Jan. 27, 2015

(54) SEMI-ACTIVE LASER (SAL) BEACON

(71) Applicant: Raytheon Company, Waltham, MA (US)

(72) Inventor: Jorge L. Gutierrez, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 89 days.

(21) Appl. No.: 13/645,299

(22) Filed: Oct. 4, 2012

(65) Prior Publication Data

US 2014/0231652 A1    Aug. 21, 2014

(51) Int. Cl.
*H01S 3/11* (2006.01)
*G01J 1/42* (2006.01)

(52) U.S. Cl.
CPC .................. *H01S 3/11* (2013.01); *G01J 1/4257* (2013.01); *G01J 2001/4242* (2013.01)
USPC ....................................................... 250/353

(58) Field of Classification Search
CPC ................................. G01N 21/64; G01J 1/00
See application file for complete search history.

(56) References Cited

U.S. PATENT DOCUMENTS

| | | | |
|---|---|---|---|
| 6,262,800 B1 * | 7/2001 | Minor | 356/139.07 |
| 8,188,411 B2 * | 5/2012 | McCarthy | 244/3.16 |
| 8,502,128 B1 * | 8/2013 | Streuber et al. | 244/3.16 |
| 2010/0196908 A1 * | 8/2010 | Opalsky et al. | 435/6 |

* cited by examiner

*Primary Examiner* — David Porta
*Assistant Examiner* — Faye Boosalis
(74) *Attorney, Agent, or Firm* — Eric A. Gifford

(57) ABSTRACT

A SAL beacon emulates the signature (e.g. spectral band, size and shape, power level and designation code) of a SAL designator beam reflected off a target. The SAL beacon is field-portable, capable of extended continuous operation and eye-safe. The SAL beacon enables "captive" flight tests of munitions and SAL receivers without the logistical complications of using an operational SAL designator.

20 Claims, 7 Drawing Sheets

SEMI-ACTIVE LASER (SAL) BEACON

BACKGROUND OF THE INVENTION

1. Field of the Invention

This invention relates to testing of Semi-Active Laser (SAL) receivers, and more particularly to a SAL beacon that emulates the signature of a SAL designator beam reflected off a target for captive flight-testing of the SAL receiver.

2. Description of the Related Art

Guided Munitions such as missiles, rockets, gun-launched projectiles or bombs may be provided with a fixed or gimballed SAL receiver to detect and track a laser spot to guide the munition to a target. A SAL designator lases the target with an IR laser beam that reflects off the target to form the laser spot. The designator modulates the laser beam with a designation code so that the SAL receiver can discriminate valid and invalid laser spots.

A SAL receiver includes optics to collect and focus the reflected laser energy into a spot on a detector that is responsive to incident energy in the IR spectrum. The detector generates one or more signals that indicate the position of the spot. Most SAL receivers use a quad-cell detector that: outputs sum and difference signals based on measurements from each of the tour cells that indicate the position of the spot. A guidance processor processes these signals to first extract and validate the designation code and then to determine guidance signals based on the position of the spot to guide the munition towards the spot, hence the target.

The design and implementation of the SAL receiver and its host munition must be rigorously tested. An initial rudimentary test is performed in the lab with as simple band-held wand. The wand includes a simple light emitting diode (LED) and modulator that ennui laser beam that is modulated with a designation code. The wand has limited power and must be held up to the SAL receiver. The wand emits a beam that remains stable for only about a few seconds, which is sufficient to verify that the detector is responding, to the IR, beam and to verify the designation code but little else.

To fully test the SAL. receiver and its host munition, the SAL receiver must be excercised over an entire mission from initial target acquisition through launch, tracking and finally end game operations under different tactical and environmental scenarios. These tests are performed on a test. range using an operational SAL designator to illuminate a target and produce a spot that can be acquired a few kilometers away in either a "captive" test in which the munition is mounted on helocopter and flown to emulate the mission without destroying the lased target or a "live fire" test in which the munition is launched, fired, dropped to execute the mission and destroy the target.

For both security and safety reasons, the use of operational SAL designators is tightly controlled. The logistical complexities and cost of performing these tests are high, and not conducive to providing a robust test environment. For example, the designation beam emitted by the SAL designator is not "eye-safe". This is a major safety concern on test ranges that greatly increases the logistical problems. Also, the SAL designator can only generate a stable designation beam for a limited time period, enough to perform the mission in the field but not optimum to run tests all day long. Because of the logistical issues "captive" tests are only performed on the same day as "live fire" tests.

SUMMARY OF THE INVENTION

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining claims that are presented later.

The present invention provides a SAL beacon that emulates the signature (e.g. spectral band, size and shape, power level and designation code) of a SAL designator beam reflected off a target. The SAL beacon is field-portable, capable of extended continuous operation and eye-safe. The SAL beacon enables "captive" flight tests of munitions and SAL receivers without the logistical complications of using an operational SAL designator.

In an embodiment, the SAL beacon comprises a laser assembly including a laser that emits a coherent beam in the infrared (IR) spectrum and a modulator that modulates the coherent beam to produce a pulsed coherent beam. A diffuser scatters the pulsed coherent beam to produce a pulsed non-coherent beam. An optical assembly comprising a primary Fresnel lens and a secondary Fresnel lens collects and shapes the pulsed non-coherent beam to form a spot that emulates the signature of a SAL designator beam reflected off a target. Small changes in the positions of the Fresnel lenses produce a large variation in the distance at which the spot is formed. Thus, with minor positional adjustments the SAL beacon can be used to test a wide variety of guided munitions that acquire the spot (target) at widely varying range-to-target. An environmental assembly in which the laser assembly is mounted on a heat sink and placed in a thermoelectric cooler regulates the temperature of the laser to provide extended continuous operation.

These and other features and advantages of the invention will be apparent to those skilled in the art from the following detailed description of preferred embodiments, taken together with the accompanying drawings, in which:

DETAILED DESCRIPTION OF THE INVENTION

The present invention provides a SAL beacon that emulates the signature (e.g. spectral band, size and shape, power level and designation code) of a SAL designator beam reflected off a target. The SAL beacon is field-portable, capable of extended continuous operation and eye-safe. The SAL beacon enables "captive" flight tests of munitions and SAL receivers without the logistical complications of using an operational SAL designator. These "captive" flight tests can he used to develop and test a new SAL receiver or munition design or to test a munition before it is released to the customer.

Figure 1:
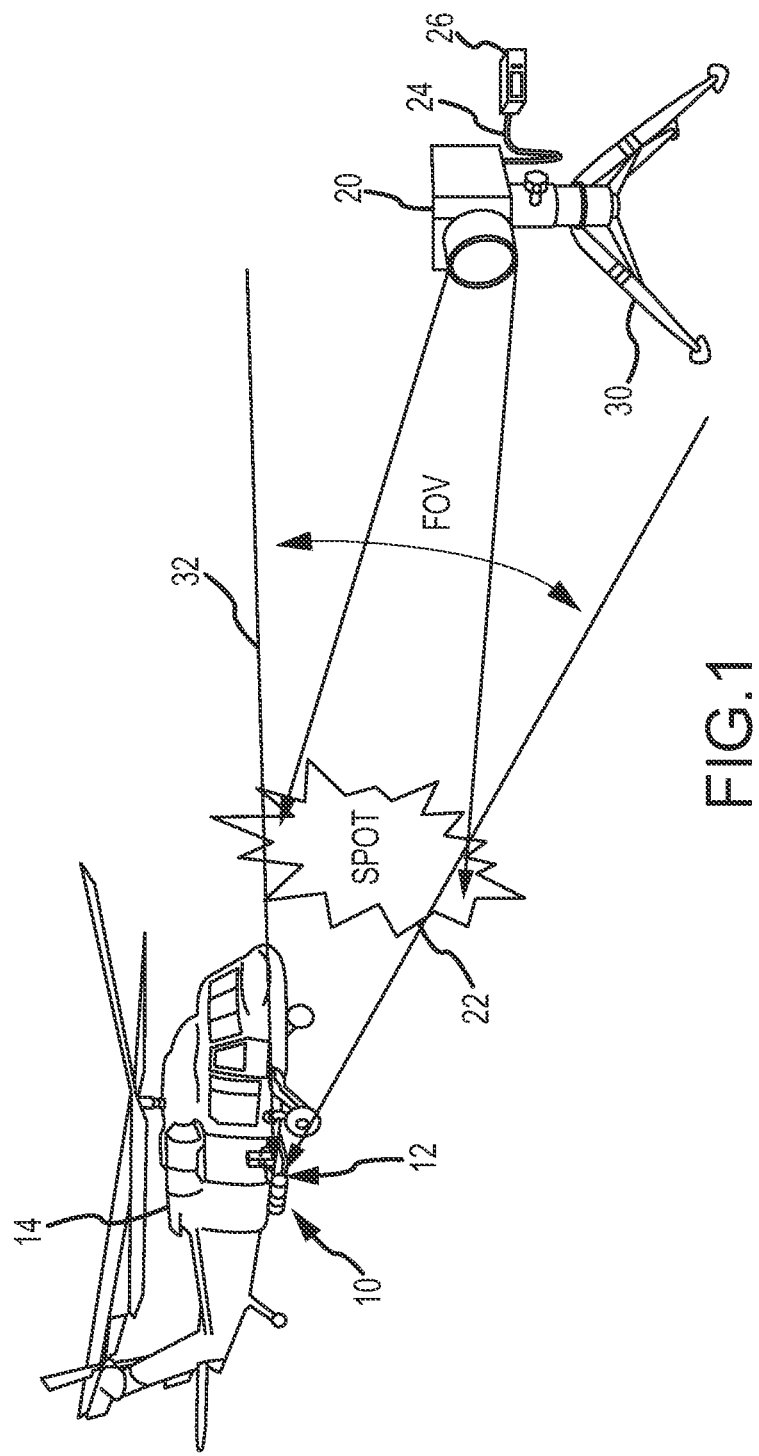
FIG. 1 is a diagram of a captive test using a SAL beacon to provide a spot that emulates the signature of a SAL designator beam reflected off of a target.

Referring now to FIG. 1, a captive flight test is depicted in which a guided munition 10 that includes a SAL receiver 12 is mounted on an air vehicle 14. The guided munition may be a missile, rocket, gun-launched projectile or bomb. The air vehicle may be a helicopter (as shown here), a manned airplane or an unmanned aerial vehicle (UAV). The air vehicle 14 flies the guided munition 10 on its mission through target acquisition, launch, tracking and end-game operations to exercise the SAL receiver, guidance and other munition systems. The munition outputs guidance signals to the pilot (e.g. an audio tone) or to an auto-pilot to fly the air vehicle 14 to emulate the munition course corrections. The munition also outputs various data that is captured to analyze munition and SAL receiver performance.

A SAL beacon 20 projects a spot 22 that emulates the signature of a SAL designator beam reflected off a target. The SAL beacon is capable of projecting spot 22 with the same spectral band, size and shape, power level and designation code as the reflected signature. The SAL beacon has both the power and optical capability to form the spot over a wide range of distances from the "target" to test different types of munitions. The projected spot is "eye safe". The SAL beacon has the capability to form the spot over extended continuous run times of several minutes, several hours or as long as required to conduct the captive test.

As shown, the SAL beacon 20 is connected via a cable 24 to a laser controller 26. Laser controller 26 can be external as shown or integrated into the SAL beacon. A laser power supply is part of the laser controller. The controller may be locally or remotely controlled.

As shown, the SAL beacon 20 is gimbal mounted on a tripod 30. This allows the SAL beacon 20 to rotate on the tripod in pitch and yaw and project spot 22 within the field-of-view 32 of the SAL receiver. A human operator may manually point the SAL beacon 20 at the approach air vehicle using, for example, a gun sight mounted on the beacon. Alternately, a motorized, pointing mechanism on the SAL beacon or tripod may be used to point the SAL beacon. The motorized pointing mechanism may be locally or remotely controlled by a human operator. Alternately, the motorized pointing mechanism may be slaved to the current FOV 32 of the SAL receiver 14. The SAL receiver/munition/air vehicle may transmit the current FOV of the SAL receiver to the SAL beacon, which in turn controls the motorized pointing mechanism to place the spot within the current FOV. In other embodiments, the SAL beacon 20 could be mounted on a tripod without a gimbal, strapped down onto a vehicle and driven around or held and pointed by the human operator.

Figure 2A:
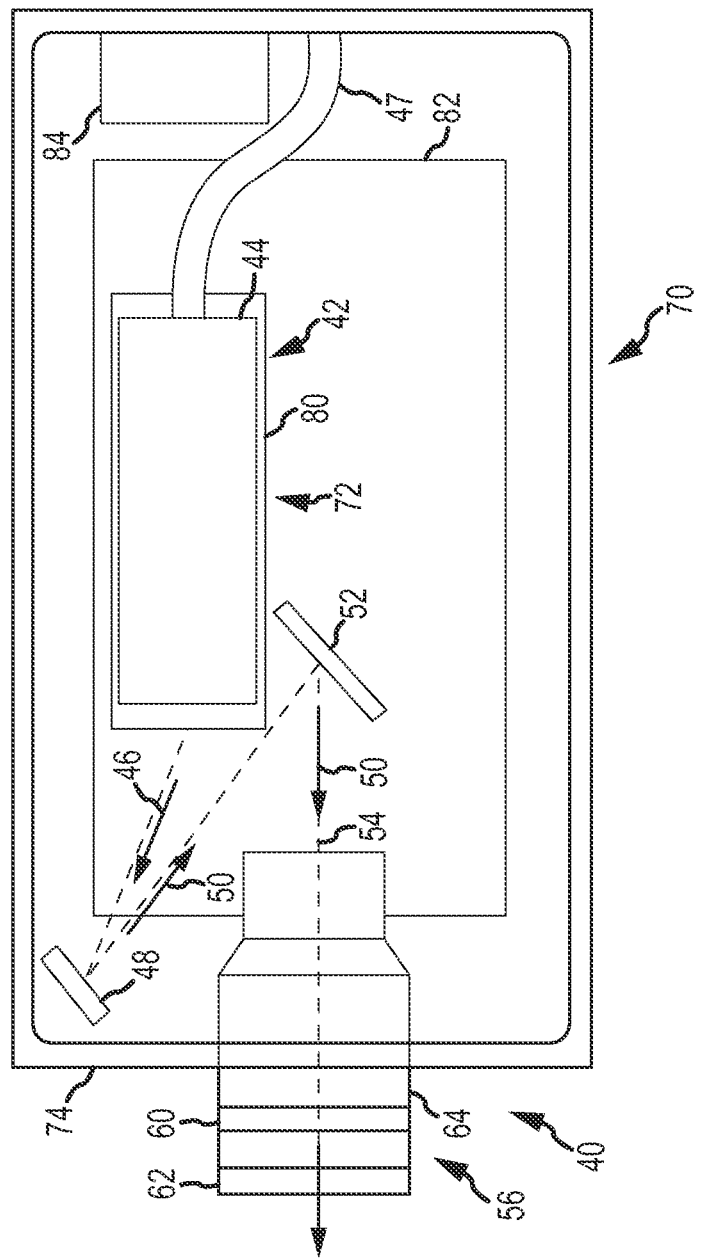
FIGS. 2a and 2b are top and side views of an embodiment of the SAL beacon and FIG. 2c is an end view of the heat sink.
Figure 2B:
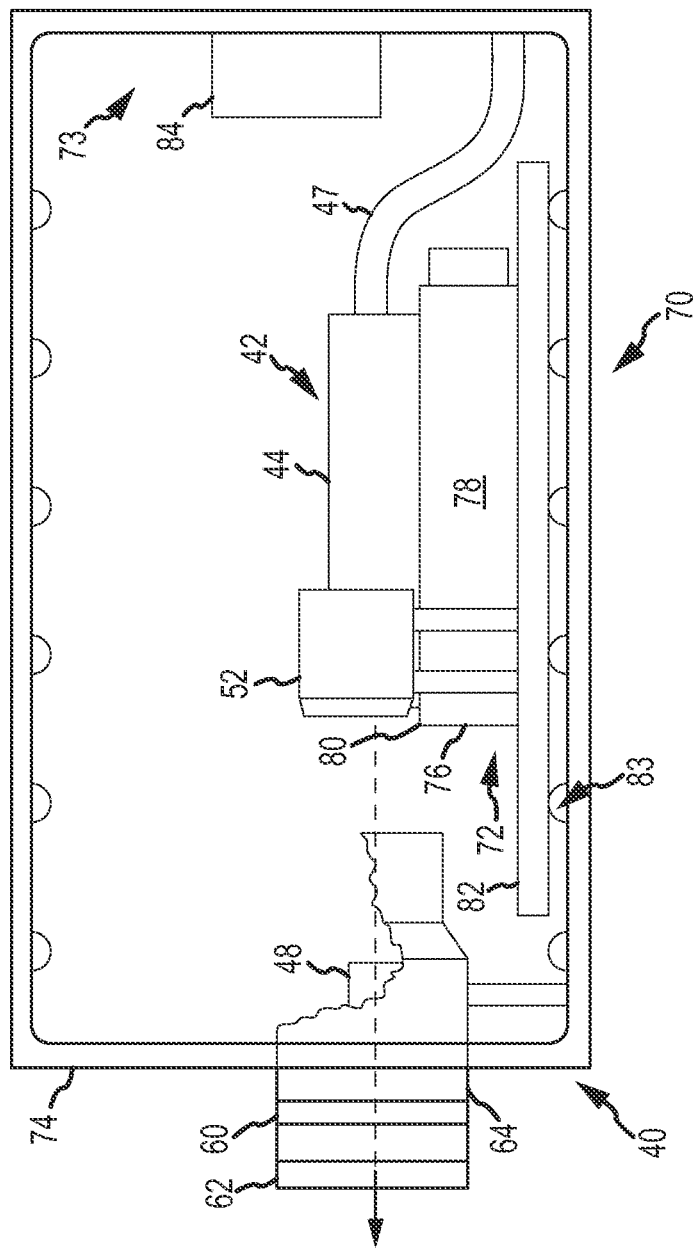
Figure 2C:
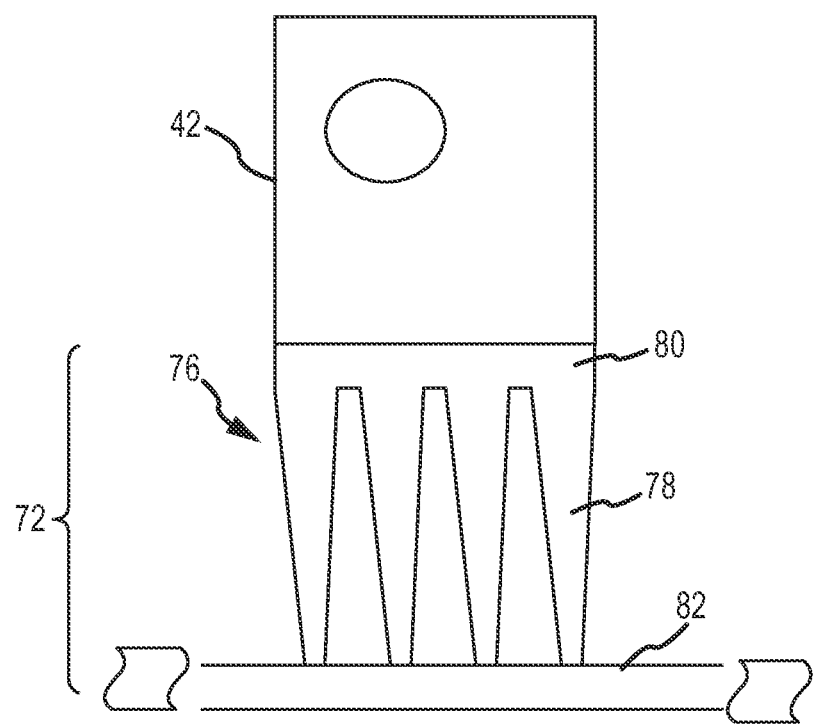

Referring now to FIGS. 2a and 2b, an embodiment of a SAL Beacon 40 the SAL beacon comprises a laser assembly 42 including a laser 44 (such as a diode-pumped. Yttrium laser) that emits a coherent beam in the infrared (IR) spectrum. A cable 47 connects the laser assembly to an external laser controller. The laser controller includes a code generator that generates modulation codes and a modulator that modulates the coherent beam in accordance with the codes to produce a pulsed coherent beam 46.

A diffuser 48 scatters the pulsed coherent beam 46 to produce a pulsed non-coherent beam 50. In this embodiment, diffuser 48 comprises a reflective material such as Barium Sulfate or Spectralon®. A mirror 52 redirects the pulsed non-coherent beam 50 along an optical axis 54. Alternately, diffuser 48 could be formed by transmissive optics.

An optical assembly 56 is centered on optical axis 54 to collect and shape the pulsed non-coherent beam 50 to form a spot that emulates the signature of a SAL designator beam reflected off a target. Optical assembly 56 comprises a primary Fresnel lens 60 and a secondary Fresnel lens 62 that are held in place by an optical mount 64. The mount may include a threaded mount for each Fresnel lens such that rotation of the lens changes its position along the optical axis, hence the focal length of the assembly. Alternately, the mount may include spacers that can be swapped in and out to change lens position.

The Fresnel lenses form the spot at the focal length of the assembly, which determines how far away from the SAL beacon the spot can be acquired by the SAL receiver. The use of both primary and secondary Fresnel lenses allows the spot to be formed kilometers away from the SAL beacon (i.e. the apparent target). Furthermore, small changes in the positions of the Fresnel lenses (on the order of centimeters) produce a large variation (on the order of kilometers) in the distance at which the spot is formed. Thus, with minor positional adjustments the SAL beacon can be used to test a wide variety of guided munitions that acquire the spot (target) at widely varying range-to-target.

An environmental assembly 70 regulates the temperature of the laser to provide extended continuous operation of several minutes to several hours. For stable operation, the temperature of the laser must be tightly regulated. To project the spot kilometers in the distance the laser must be very powerful, which means it produces a lot of heat. This heat must be removed to maintain the laser temperature and stable operation.

The environmental assembly 70 includes a heat sink 72 that transfers heat from the laser to the surrounding air and a thermoelectric cooler 73 that transfers heat from the surrounding air to the ambient environment outside the cooler. Heat sink 72 should have sufficient mass to temporarily store heat from the laser and sufficient surface area to transfer the heat to the surrounding air. The thermoelectric cooler 73 should have sufficient heat transfer capacity to remove that heat to maintain a thermal gradient between the laser and heat sink to dissipate a larger amount of heat than the laser can generate. This allows the laser to run below its minimum temperature requirement and run indefinitely. If either the heat sink 72 or the thermo electric cooler 73 does not provide sufficient heat transfer capacity heat will build up in the laser and the laser will eventually destabilize. Although the capability to ran indefinitely may be preferred, configurations that provide hours or even tens of minutes of continuous operation may be satisfactory to conduct captive tests. The use of the thermoelectric cooler 73 is the critical element to enabling the SAL beacon to provide sufficient continuous operation for captive flight tests. The use of the finned heat sink with the thermoelectric cooler provides continuous operation in the tens of minutes. Optimization of the heat sink allows the laser to run indefinitely. The use of the finned heat sink and mounting plate with the thermoelectric cooler provided demonstrated continuous operation of hours and should be sustainable indefinitely.

In this embodiment, the heat sink 72 includes both a primary heat sink and a secondary heat sink to transfer heat from the laser. The primary heat sink is a finned heat sink 76 having a plurality of fins 78 extending from a fin base 80. The laser 44 is mounted on fin base 80. The secondary heat sink is a mounting plate 82. The fins 78 are supported on mounting plate 82. In this embodiment, the mounting plate 82 is spaced away from the wall of the cooler by corrugated ribs 83 to facilitate air-flow around the plate and heat transfer to the environment inside the enclosure. The finned heat sink 76 and mounting plate 82 are suitably formed from Aluminum or any other suitable metal. In this configuration, mounting plate 82 serves two disparate functions. First, the mounting plate 82 provides additional mass and surface area to efficiently transfer heat away from the laser. Second, the mounting plate 82 provides a mechanical mount for attaching the SAL beacon to the tripod. A similar mounting plate on the tripod is bolted to mounting plate 82 through the wall of the cooler. Other heat sink configurations may provide the requisite mass and heat transfer.

Thermoelectric cooler 73 includes an insulated enclosure 74 and a cooling unit 84. Insulated enclosure 74 defines a local environment surrounding the laser 44 and heat sink that is thermally isolated from the surrounding ambient environment. Cooling unit 84 transfers heat from the local environment inside enclosure 74 to the outside ambient environment. The temperature of one or more of the laser, heat sink or air temperature inside the enclosure is coupled to the cooling unit. The cooling unit 84 modulates how much heat is transferred out of the insulated enclosure to maintain the temperature of one or more of the laser, heat sink or air temperature inside the enclosure at a target temperature to ensure stable operation of the laser.

In an embodiment, cooling unit 84 comprises a small Peltier cooler. A Peltier cooler is a solid-state active beat pump that transfers beat from one side of the device (inside the enclosure) to the other side of the device (outside the enclosure) with consumption of electrical energy. The Peltier cooler is connected to a power supply external to the SAL beacon. A small fan blows heat away front the enclosure. Another small tint inside the enclosure directs the cold air towards the laser assembly. in another embodiment, cooling unit 84 comprises a canister of liquid Nitrogen. The canister may inject liquid Nitrogen inside the enclosure to cool the laser assembly.

Figure 3:
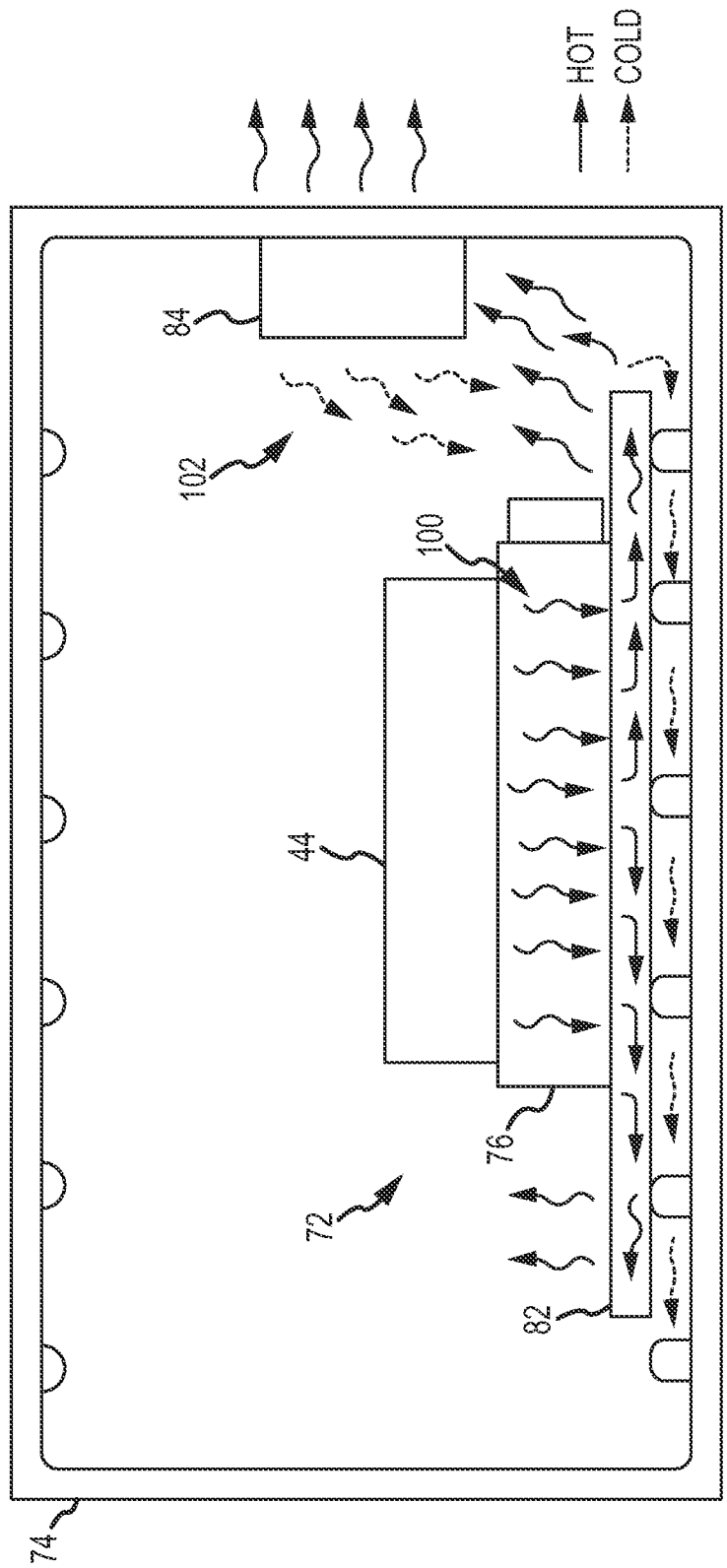
FIG. 3 is a diagram of the thermal transfer of heat from the laser through the heat sink and thermoelectric cooler to the ambient environment.
Figure 4:
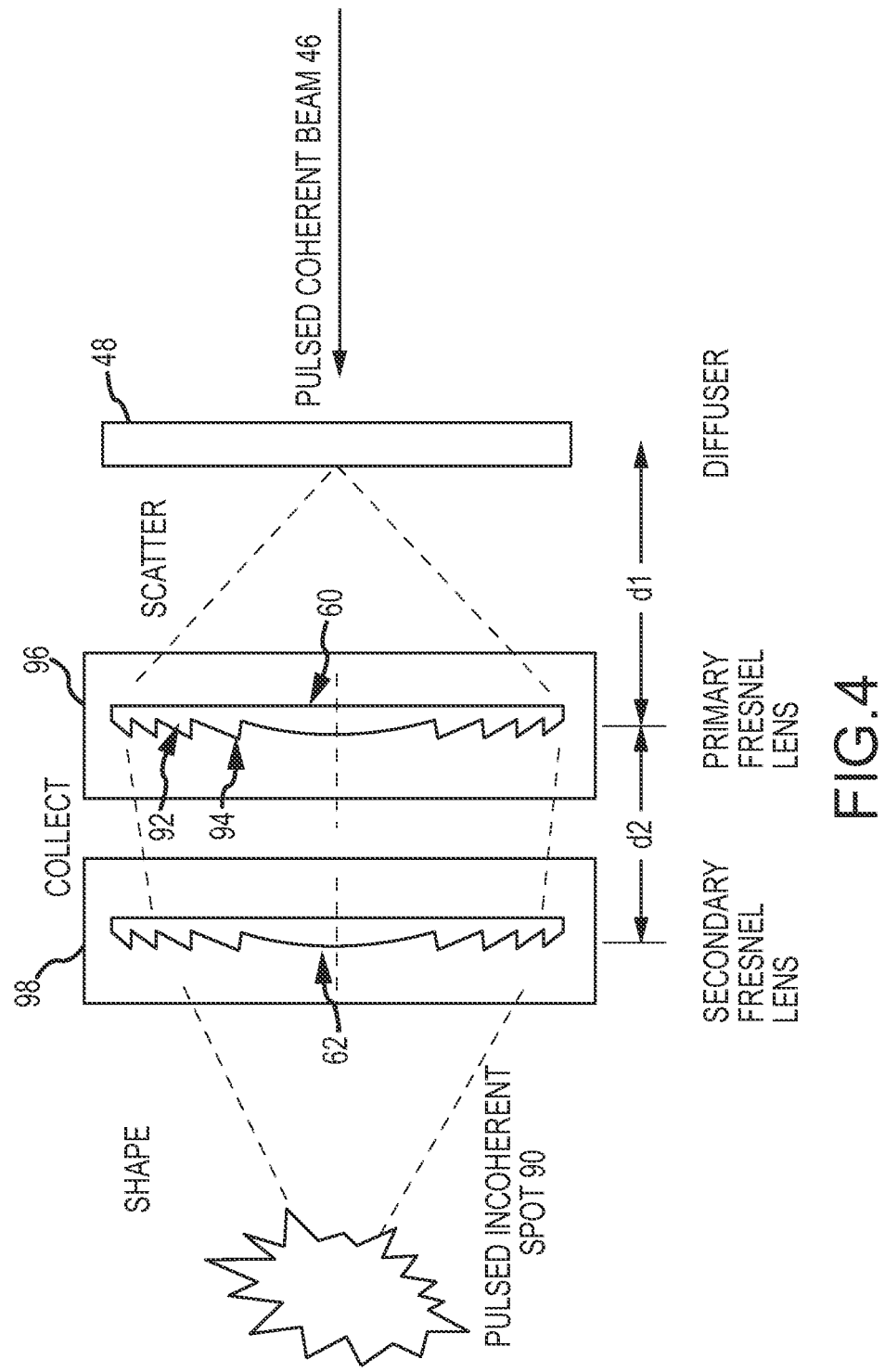
FIG. 4 is a diagram of an embodiment of the diffuser and optical assembly of the SAL beacon.

As shown in FIG. 3, heat 100 from the laser flows through firmed heat sink 76 to mounting plate 82 and into the local environment inside insulated enclosure 74. Cooling unit 84 transfers the heat 100 to the external ambient environment. Either the Peltier cooler or liquid Nitrogen effectively infect cold air 102 to the local environment Referring now to FIG. 4, diffuser 48 scatters the light in the pulsed coherent beam in optics, a diffuser is any device that diffuses or spreads out or scatters light in some manner, to give soft light. Diffuse light can be easily obtained by making light to reflect diffusely from a white surface, while more compact optical diffusers may use translucent objects, and can include ground glass diffusers, Teflon diffusers, holographic diffusers, opal glass diffusers, and greyed glass diffusers.

The primary Fresnel lens 60 and secondary Fresnel lens 62 collect and shape the light to form a spot 90. A Fresnel lens allows the construction of lenses of large aperture and short focal length without the mass and volume of material that would be required by a lens of conventional design. A Fresnel lens can he made much thinner than a comparable conventional lens—in some cases taking the form of a flat sheet. The Fresnel lens reduces the amount of material required compared to a conventional spherical lens by dividing the lens into a set of concentric annular sections known as "Fresnel zones." in theory there are infinitely many such zones. In each of these zones, the overall thickness of the lens is decreased, effectively dividing the continuous surface of a standard lens into a set of surfaces 92 of the same curvature, with stepwise discontinuities 94 between them. A Fresnel lens can be regarded as an array of prisms arranged in a circular fashion, with steeper prisms on the edges and a nearly flat convex center Fresnel lens design allows a substantial reduction in thickness (and thus mass and volume of material), at the expense of reducing the imaging quality of the lens, which is why precise imaging applications such as photography still use conventional bulky (non-Fresnel) lenses. In this application, the image quality of the spot 90 is not a concern.

As shown, the primary and secondary Fresnel lenses are each mounted on threaded lens mounts 96 and 98, respectively. Rotation of the lens mounts varies the position of the lens, hence the distance d2 or d1 to diffuser 48, to vary the focal length of the assembly. Small changes in these distances, on the order of a few centimeters, can produce changes in the focal length on the order of a few kilometers, a factor of $10^5$ or more. The SAL beacon should have both the power and optical capability to project spot 90 up to a few kilometers and to vary the projection distance by a few kilometers. Different munitions will have different range-to-target at which the spot is acquired.

Figure 5:
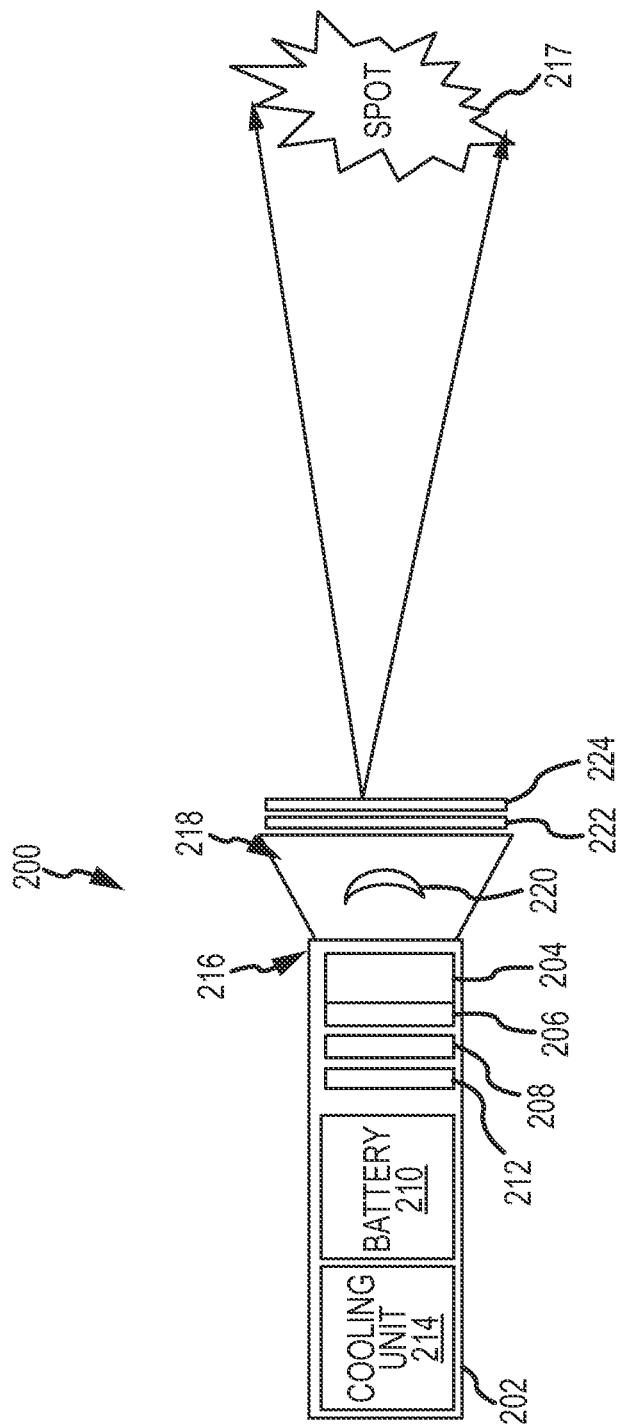
FIG. 5 is an embodiment of a hand-held SAL beacon.

FIG. 5 depicts an embodiment of a hand-held SAL beacon wand 200. The wand 200 includes each of the components of the full-sized SAL beacon in a smaller hand-held package. The basic package includes a thermally insulated enclosure 202. A laser diode 204 is mounted on a beat sink 206 inside the enclosure. A diode controller 208 controls laser diode 204 to generate a modulated coherent beam. A battery 210 and power-conditioning unit 212 supply power to the diode controller 208 and laser diode 204. A cooling unit 214 transfers heat from inside enclosure 202 to the ambient environment outside the wand. Cooling unit 214 may be a Peltier type cooler that draws power from the battery or a replaceable unit such as a liquid Nitrogen cartridge. An optical assembly 216 is attached to enclosure 202 to form and project as spot 217. Optical assembly may include a parabolic mirror 218 that collects the beam such as found in a conventional flashlight. The assembly includes a diffuser 220 that scatters the coherent beam to form a modulated non-coherent beam and primary and secondary Fresnel lenses 222, 224 to collect and shape the beam to form the spot 217. A conventional beam focus feature 216 found on a flashlight can be used to adjust the position of the Fresnel lens to change the focal length of the spot. The parabolic mirror 218 allows for a finer/quicker focus of the beam by rotating focus feature 216.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

I claim:

1. A semi-active laser (SAL) beacon for flight testing a missile having a SAL receiver with a field-of-view (FOV), said SAL beacon comprising:
   a laser assembly including a laser that emits a coherent beam in the infrared (IR) spectrum and a modulator that modulates the coherent beam to produce a pulsed coherent beam;
   a diffuser that scatters the pulsed coherent beam to produce a pulsed non-coherent beam;
   an optical assembly comprising a primary Fresnel lens and a secondary Fresnel lens at first and second distances from the diffuser that collect and shape the pulsed non-coherent beam to form and project a spot into the receiver FOV that emulates the signature of a SAL designator beam reflected off a target; and
   an environmental assembly comprising a heat sink on which the laser assembly is mounted, an insulated enclosure around the laser assembly and heat sink, and a cooling unit that removes heat from inside the enclosure.

2. The SAL Beacon of claim 1, wherein the laser is a diode-pumped Yttrium laser.

3. The SAL beacon of claim 1, wherein the modulator modulates the coherent beam with a SAL designation code for handshaking with a SAL receiver.

4. The SAL beacon of claim 3, wherein the spot mimics a signature of a SAL laser designator reflected off of a target in IR spectrum.

5. The SAL beacon of claim 4, wherein the pulsed non-coherent beam and formed spot are eye-safe, whereas the SAL laser designator and the reflected signature are not eye-safe.

6. The SAL beacon of claim 1, wherein the optical assembly further comprises:
an adjustment mechanism for adjusting the positions of said primary and secondary Fresnel lenses to change a focal length at which the spot is formed.

7. The SAL beacon of claim 1, further comprising:
a mount for supporting the SAL beacon on a three-dimensional gimbal; and
a pointing mechanism for rotating the SAL beacon on the gimbal to form the spot in a given direction.

8. The SAL beacon of claim 7, wherein the pointing mechanism is slaved to a SAL receiver on an airborne missile to keep the spot within a field-of-view of the SAL receiver.

9. The SAL beacon of claim 1, wherein said environmental assembly stabilizes an internal temperature of the laser to sustain continuous run times of at least 10 minutes during which the laser emission of the coherent beam remains stable.

10. The SAL beacon of claim 1, wherein said heat sink comprises:
a primary heat sink on which the laser assembly is mounted; and
a secondary heat sink on which said primary heat sink is mounted.

11. The SAL beacon of claim 10, wherein said environmental assembly stabilizes an internal temperature of the laser to sustain continuous run times of at least 8 hours during which the laser emission of the coherent beam remains stable.

12. The SAL beacon of claim 10, wherein said cooling unit removes heat from inside the enclosure to stabilize the temperature of the secondary heat sink.

13. The SAL beacon of claim 10, wherein said primary heat sink is a finned heat sink comprising a fin base and a plurality of spaced fins extending from said fin base and said secondary heat sink comprises a plate, said laser assembly mounted on said fin base and said plurality of spaced fins mounted on said plate, said plate having a larger surface area than said fin base.

14. The SAL beacon of claim 1, wherein the cooling unit comprises a peltier cooler.

15. A system for captive testing of a SAL receiver, comprising:
a missile outfitted with the SAL receiver, said SAL receiver having a FOV for detecting an IR signature reflected off a target, said IR signature modulated with a SAL designation code;
an air vehicle on which the missile is mounted to fly the captive missile in a simulated mission to test the SAL receiver; and
a semi-active laser (SAL) beacon that projects an IR spot that emulates the IR signature reflected off a target, said IR spot modulated with the SAL designation code, said SAL beacon comprising,
a laser assembly including a laser that emits a coherent beam in the infrared (IR) spectrum and a modulator that modulates the coherent beam to produce a pulsed coherent beam encoded with the SAL designation code;
a diffuser that scatters the pulsed coherent beam to produce a pulsed non-coherent beam;
an optical assembly comprising a primary Fresnel lens and a secondary Fresnel lens at first and second distances from the diffuser that collect and shape the pulsed non-coherent beam to form the IR spot in the FOV of the SAL receiver; and
an environmental assembly comprising a heat sink on which the laser assembly is mounted, an insulated enclosure around the laser assembly and said heat sink, and a cooling unit that removes heat from inside the enclosure to maintain a stable temperature of the laser.

16. The SAL beacon of claim 15, wherein said heat sink comprises:
a primary heat sink on which the laser assembly is mounted; and
a secondary heat sink on which said primary heat sink is mounted.

17. The SAL beacon of claim 16, wherein said environmental assembly stabilizes an internal temperature of the laser to sustain continuous run times of at least 8 hours during which the laser emission of the coherent beam remains stable.

18. The SAL beacon of claim 15, wherein said primary heat sink is a finned heat sink comprising a fin base and a plurality of spaced fins extending from said fin base and said secondary heat sink comprises a plate, said laser assembly mounted on said fin base and said plurality of spaced fins mounted on said plate, said plate having a larger surface area than said fin base.

19. A method for captive testing of a SAL receiver, said method comprising:
outfitting a missile with the SAL receiver, said SAL receiver having a FOV for detecting an IR signature reflected off a target, said IR signature modulated with a SAL designation code;
mounting the missile on an air vehicle and flying the air vehicle and captive missile in a simulated mission to test the SAL receiver;
projecting from a semi-active laser (SAL) beacon an IR spot that emulates the IR signature reflected off a target, said IR spot modulated with the SAL designation code, said SAL beacon emitting a pulsed coherent beam in the infrared (IR) spectrum encoded with the SAL designation code, scattering the beam to produce a pulsed non-coherent beam, and collecting and shaping the pulsed non-coherent beam with a primary Fresnel lens and a secondary Fresnel lens to form the IR spot in the FOV of the SAL receiver; and
enclosing the laser and a heat sink on which the laser is mounted within an insulated enclosure and removing heat from inside the enclosure to maintain a stable temperature of the laser.

20. The method of claim 19, wherein the heat sink comprises a finned heat sink having a fin base and a plurality of spaced fins extending from said fin base and a plate, said laser mounted on said fin base and said plurality of spaced fins mounted on said plate, said plate having a larger surface area than said fin base.

* * * * *